United States Patent
Sørensen

(10) Patent No.: US 11,055,327 B2
(45) Date of Patent: Jul. 6, 2021

(54) UNSTRUCTURED DATA PARSING FOR STRUCTURED INFORMATION

(71) Applicant: Neopost Technologies, Bagneux (FR)

(72) Inventor: Kasper Sørensen, Seattle, WA (US)

(73) Assignee: QUADIENT TECHNOLOGIES FRANCE, Bagneux (FR)

(*) Notice: Subject to any disclaimer, the term of this patent is extended or adjusted under 35 U.S.C. 154(b) by 178 days.

(21) Appl. No.: 16/225,268

(22) Filed: Dec. 19, 2018

(65) Prior Publication Data

US 2020/0004765 A1 Jan. 2, 2020

Related U.S. Application Data

(60) Provisional application No. 62/692,849, filed on Jul. 1, 2018.

(51) Int. Cl.
| | | |
|---|---|---|
| *G06F 17/00* | (2019.01) | |
| *G06F 16/31* | (2019.01) | |
| *G06F 16/35* | (2019.01) | |
| *G06N 20/00* | (2019.01) | |
| *G06K 9/62* | (2006.01) | |

(52) U.S. Cl.
CPC .......... *G06F 16/313* (2019.01); *G06F 16/353* (2019.01); *G06K 9/6256* (2013.01); *G06N 20/00* (2019.01)

(58) Field of Classification Search
CPC ..... G06F 16/313; G06F 16/353; G06N 20/00; G06K 9/6256
See application file for complete search history.

(56) References Cited

U.S. PATENT DOCUMENTS

| | | | |
|---|---|---|---|
| 5,452,203 | A | 9/1995 | Moore |
| 5,583,970 | A | 12/1996 | Strobel |
| 5,799,302 | A | 8/1998 | Johnson |
| 6,026,397 | A | 2/2000 | Sheppard |
| 6,320,670 | B1 | 11/2001 | Kenbeek |
| 6,337,743 | B1 | 1/2002 | Brown |
| 6,438,546 | B1 | 8/2002 | Higgins |
| 6,523,019 | B1 | 2/2003 | Borthwick |
| 6,557,000 | B1 | 4/2003 | Seestrom |
| 6,658,430 | B1 | 12/2003 | Harman |
| 6,895,427 | B2 | 5/2005 | Quine |
| 6,934,714 | B2 | 8/2005 | Meinig |
| 6,961,721 | B2 | 11/2005 | Chaudhuri |

(Continued)

OTHER PUBLICATIONS

A. Q. Mahlawi and S. Sasi, "Structured data extraction from emails," 2017 International Conference on Networks & Advances in Computational Technologies (NetACT), Thiruvanthapuram, pp. 323-328,Oct. (Year: 2017).*

(Continued)

*Primary Examiner* — Greta L Robinson
(74) *Attorney, Agent, or Firm* — Butzel Long

(57) ABSTRACT

Systems and methods are provided for computerized, automatic processing of unstructured text to extract bits of contact data to which the extracted text can be linked or attributed. Unstructured text is received and text segments within the text are enriched with metadata labels. A machine learning system is trained on, and used to parse feature values for the text segments and the metadata labels to classify text and generate structured text from the unstructured text.

22 Claims, 4 Drawing Sheets

(56) References Cited

U.S. PATENT DOCUMENTS

| | | |
|---|---|---|
| 7,058,586 B1 | 6/2006 | Law |
| 7,200,604 B2 | 4/2007 | Forman |
| 7,281,001 B2 | 10/2007 | Caulfield |
| 7,287,019 B2 | 10/2007 | Kapoor |
| 7,296,011 B2 | 11/2007 | Chaudhuri |
| 7,376,680 B1 | 5/2008 | Kettler |
| 7,392,240 B2 | 6/2008 | Scriffignano |
| 7,516,149 B2 | 4/2009 | Motwani |
| 7,523,098 B2 | 4/2009 | Hirsch |
| 7,577,653 B2 | 8/2009 | Dasari |
| 7,634,464 B2 | 12/2009 | Chen |
| 7,818,333 B2 | 10/2010 | Biard |
| 8,032,546 B2 | 10/2011 | Arasu |
| 8,332,366 B2 | 12/2012 | Schumacher |
| 8,429,137 B2 | 4/2013 | Brittain |
| 8,755,310 B1 * | 6/2014 | Gopalakrishnan ...... H04M 3/56 370/260 |
| 8,838,549 B2 | 9/2014 | Bodapati |
| 8,918,422 B2 | 12/2014 | Stelman |
| 8,943,057 B2 | 1/2015 | Dua |
| 9,542,412 B2 | 1/2017 | Bates-Haus |
| 2005/0075988 A1 | 4/2005 | Cordery |
| 2008/0065605 A1 | 3/2008 | Bourland |
| 2009/0157745 A1 | 6/2009 | Quine |
| 2009/0157821 A1 | 6/2009 | Biasi |
| 2012/0278336 A1 | 11/2012 | Malik |
| 2013/0066818 A1 * | 3/2013 | Assadollahi ........... G06N 20/00 706/12 |
| 2014/0351176 A1 * | 11/2014 | Jan ......................... G06N 5/048 706/12 |
| 2015/0178371 A1 * | 6/2015 | Seth .................... G06F 16/3329 707/748 |
| 2016/0077967 A1 | 3/2016 | Golos |
| 2016/0098645 A1 * | 4/2016 | Sharma ................. G06N 20/00 706/12 |
| 2019/0005012 A1 * | 1/2019 | Priestas .................. G06F 40/30 |
| 2019/0164063 A1 * | 5/2019 | Moura ............. G06F 16/90332 |

OTHER PUBLICATIONS

Martin Seidel, Michael Krug, Frank Burian, and Martin Gaedke. KESeDa: Knowledge Extraction from Heterogeneous Semi-Structured Data Sources. In Proceedings of the 12th International Conference on Semantic Systems (SEMANTiCS 2016). Association for Computing Machinery, pp. 129-136, Sep. (Year: 2016).*

Extended European Search Report for Application No. EP19315049.7, dated Oct. 15, 2019, 7 pages.

* cited by examiner

FIG.1A

Alice Adams
President, Example Inc.          102
alice@example.com
Re: Your email

_____
_____
_____
_____
_____
_____

Sincerely,

Bob Roberts
CEO
The Business Company          101
bob@businessco.com
202 555 9053
*Building tomorrow's world today*

| | |
|---|---|
| NAME: | Alice Adams |
| TITLE: | President |
| COMPANY: | Example Inc. |
| EMAIL: | alice@example.com |
| PHONE: | *null* |
| | |
| NAME: | Bob Roberts |
| TITLE: | CEO |
| COMPANY: | The Business Company |
| EMAIL: | bob@businessco.com |
| PHONE: | 202-555-9053 |

| Text Portion | Class | Confidence |
|---|---|---|
| Alice | First | 85% |
| Adams | Last | 60% |
| President | Title | 90% |
| Example | Business Name | 35% |
| Inc | Business Name | 90% |
| alice@example.com | Email | 95% |

<u>120</u>

<u>125</u>

| Text Portion | Class | Confidence |
|---|---|---|
| Bob | First | 85% |
| Roberts | Last | 60% |
| CEO | Title | 95% |
| The | Business Name | 35% |
| Business | Business Name | 70% |
| Company | Business Name | 95% |
| bob@businessco.com | Email | 95% |
| 202 555 9053 | Phone | 90% |
| Building | Address | 35% |
| tomorrow's | Business name | 20% |
| world | Business name | 30% |
| today | -- | 0% |

UNSTRUCTURED DATA PARSING FOR STRUCTURED INFORMATION

CROSS-REFERENCE TO RELATED APPLICATION

This application is a non-provisional of and claims priority benefit to U.S. Provisional Patent Application Ser. No. 62/692,849, filed Jul. 1, 2018, the disclosure of which is incorporated by reference in its entirety.

BACKGROUND

Data, such as contact data or other personal or corporate information, may be provided in a structured or unstructured form. In a structured form, each piece of data is associated with an identification of what the data represents. For example, the form in which the data is provided may indicate that the first field in the data is a person's first name, the next field is the person's last name, and so on. In some cases, structured data may include labels that indicate the meaning of each piece of data. In contrast, unstructured data cannot be presumed to have any such structure, and it may not include any indication of what the data represents. Even in common formats such as letter and email signatures, the meaning of a particular piece of data may be readily apparent to a human, but it may not be possible to automatically process the data by a computerized system. For example, although a human may immediately understand that "CEO" after a person's name is an indication of the person's title and position within a company, a computerized system may not be able to process the name/title combination without first being provided with a description of the structure of the person's signature, i.e., a definition of the structure of the data and its meaning.

BRIEF SUMMARY

Embodiments disclosed herein provide methods, systems, and computer media that allow for converting unstructured text to structured text. In an embodiment, unstructured text may be received and a plurality of text segments may be identified within the unstructured text. The unstructured text may be enriched by assigning one or more metadata labels to each of the text segments. One or more feature values may be identified for each segment. The features values, metadata labels, and text segments may be provided to a trained machine learning system, which then may provide an indication of a classification for at least one of the text segments. The step of calculating one or more feature values for each segment may include, for example, calculating a feature value for each text segment for at least one of the metadata labels associated with at least one of the text segments. The text segments may be identified as a portion of contact data based upon the indication of the classification for the at least one of the text segments. The machine learning system also may provide a confidence score for each of the classifications, where each text segment may be identified as a portion of contact data based upon the confidence score assigned to the classification of the at least one text segment. Structured contact information may be generated for an entity based on the confidence score for each of the classifications and the text segments. Assigning the metadata labels to the text segments may include, for example, processing each text segment of the text segments with at least one enrichment source and, based upon output of the enrichment source, assigning the one or more metadata labels to each text segment. The enrichment source or sources may include, for example, a dictionary of name parts; a pattern matching system; an address-matching library; and an external contact information service.

BRIEF DESCRIPTION OF THE DRAWINGS

FIGS. 1A-1C show an example of generated structured text from unstructured text according to an embodiment disclosed herein. FIG. 1A shows an example of a source of unstructured text; FIG. 1B shows an example of text tokens (segments) extracted from the unstructured text shown in FIG. 1A; FIG. 1C shows an example of structured text.

DETAILED DESCRIPTION

Figure 2:
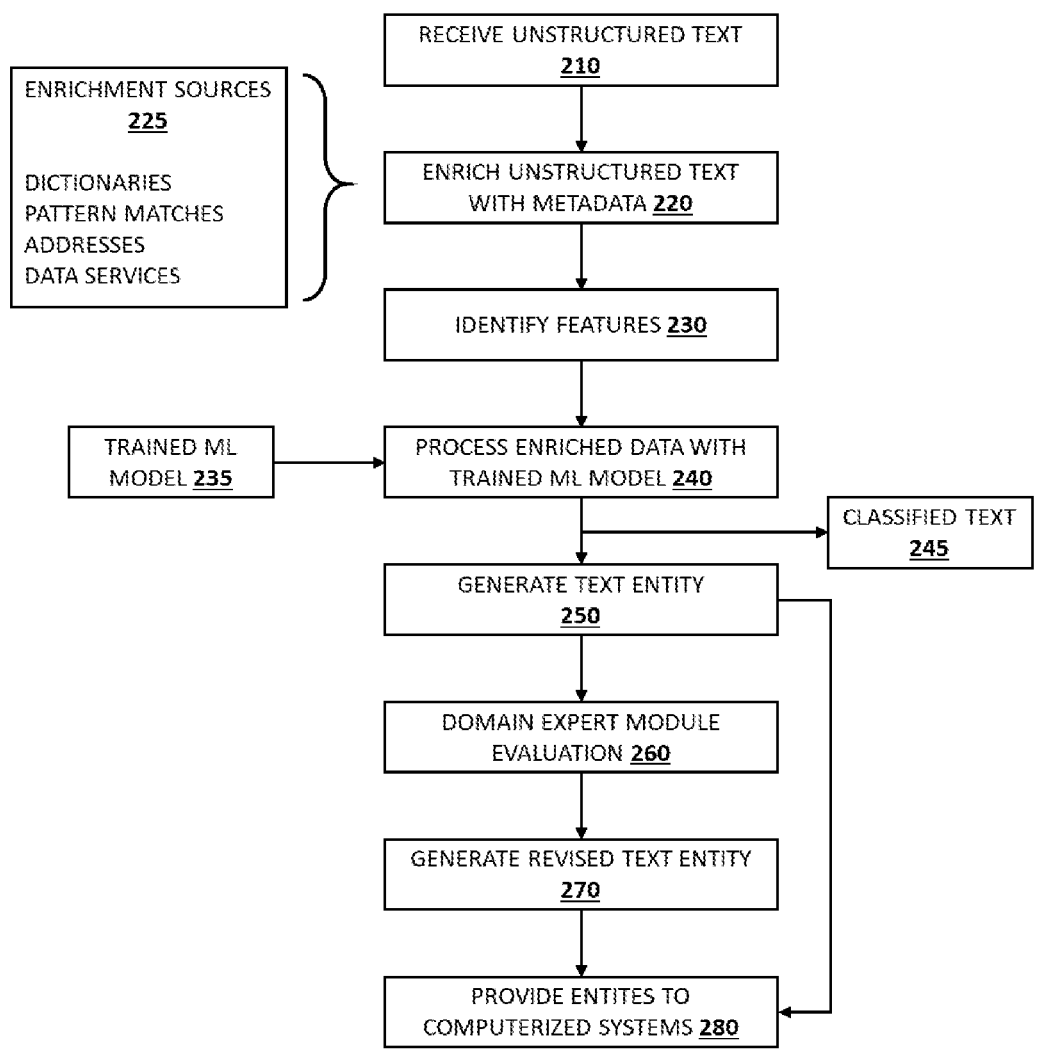
FIG. 2 shows a process for constructing structured data from unstructured data according to an embodiment disclosed herein.

It is often desirable to obtain contact information for an individual, corporation, organization, or other entity from various sources. For example, it may be desirable to obtain contact information for an individual or a business from a business card, email signature, or the like. As another example, it may be desirable to automatically obtain contact information from an electronic or printed source such as a letterhead, resume, CV, or the like. As another example, it may be desirable to obtain contact information from an arbitrary source of text, which may include other text near or with the contact information.

Embodiments disclosed herein provide for computerized, automatic "reading" and/or sense-making of unstructured text to extract bits of contact data to which the extracted text can be linked or attributed. Embodiments disclosed herein may solve problems such as finding contact details embedded in arbitrary text and presenting the contact information in a structured form, thereby allowing it to be used for automatic archiving, linking, querying, form-filling, or the like in other computerized and/or automated systems. That is, embodiments disclosed herein may transform unstructured data that is understandable by a human reader but not necessarily by a computerized processing system, into structured data that may be processed automatically by a computerized system.

FIGS. 1A-1C show a high-level schematic overview of embodiments disclosed herein that convert unstructured text to structured text. According to systems and techniques disclosed herein, unstructured text as shown in FIG. 1A may be obtained from any text source and processed to generate the metadata-enriched text shown in FIG. 1B. This text then may be processed further via a trained machine learning system and/or other systems to generate complete text entities as shown in FIG. 1C.

More specifically, a source of unstructured text 105 as shown in FIG. 1A may include one or more portions that may contain contact information or other text that is suitable for conversion to structured text. In the example shown, the letter 105 includes a signature 101 and an addressee block 102, each of which contains contact information. More generally, any source of unstructured text may be processed to identify and extract text suitable for conversion to structured text.

As described in further detail herein, the text portions 101, 102 may be processed to identify potential segments of text that may be converted to structured text. For example, the text portions 101, 102 include person details such as names, contact information, and the like. Each segment of text may be assigned classification metadata and a confidence score indicating the likelihood, based on previous training, that the classification is correct. For example, the information associated with "Alice Adams" may be assigned classifications and confidence scores as shown at 110. In this example, the system assigns a high confidence that "Alice" is a first name, "President" is a title, "Inc" is part of a business name, and "alice@example.com" is an email address, but a relatively lower confidence that "Example" is part of a business name. The system assigns a relatively mid-range confidence that "Adams" is part of a last name, for example because training data used to train the system may suggest that it also may be part of a first name, a business name, or other text classification(s). In general, the confidence score may represent any suitable probability or confidence score typically assigned by a machine learning system. As another example, the text portions associated with "Bob Roberts" may be assigned classifications and confidence scores as shown at 120. In this example, the system may assign relatively low confidence scores to text portions 125 that result from the slogan found in Bob's signature, "Building tomorrow's world today." Again, this may be due to the data used to train the processing system, or because most email signatures don't include a text slogan and therefore it is not the type of text typically processed by the system, and/or other effects. The classification metadata and examples shown in FIG. 1B are provided as simplified illustrations and, as disclosed in further detail herein, other and more extensive metadata may be used in various embodiments.

At 130, embodiments disclosed herein may generate structured versions of the previously-unstructured text. For example, when analyzing text to identify contact information, a name (including first and last), title, company name, email address, and phone number may be identified. As shown, the classified text 110, 120 may be assembled into a consistent structured format. The structured text may be encoded in any suitable way, such as comma or delineated, XML, serialized text, proprietary or custom formats, or the like. In some cases, every field may be populated or included even if it is assigned a "null" value, such as the phone number field for Alice Adams in the example. Alternatively, fields for which data was not found may be omitted entirely. The structured text may be provided to any other system that can operated on a standardized text format, such as addressing or address cleansing systems, contact management systems, customer or other entity databases, or the like.

Embodiments disclosed herein may include one or more text parsers, which may be implemented in automated computerized systems that receive and process text and provide structured contact information for use in other systems. FIG. 2 shows an example process for extracting structured text from unstructured text according to an embodiment disclosed herein. At 210, a parser may identify or be provided a set of unstructured text that contains or is believed to contain contact information for one or more entities. The parser may operate in one or more phases in which the text is analyzed.

In an enrichment phase at 220, one or more enrichment sources 225 of known text, contact information structure(s), or the like may be used to add metadata about any known or suspected matches from these sources, such as by matching text or text structure from the unstructured text to text or text structures from the data source(s). Each pair of text and metadata components may be assigned a "match score" or "confidence score" that indicates how significant the match seems to be or how confident the system is in the proposed match, and to allow for partial matching, abbreviations, and the like. For example, the term "President" occurring after a suspected name and before an email address structure in an email signature may be labeled as a "title" with a high match score, indicating that the system has a high confidence that the term represents a person's title rather than another type of data such as a name, address, phone number, etc.

A source used by the parser may include one or more dictionaries of known name parts. Such a source may include reference data obtained or built from other data sources that includes known given names, known family names, known organizational structure forms, known business keywords, and the like. Each dictionary may be obtained from a standardized source, or it may be constructed from known data of a particular type, such as data previously identified as containing each type of text. For example, a dictionary of known name parts may be built from a database of known-good postal delivery names and addresses that has previously been reviewed and structured to identify a recipient's name, address, zip code, etc. Dictionaries may contain text in one or more languages. In some cases, a word or phrase may exist in multiple dictionaries. For example, "software" may appear as a part of both company names such as "Acme Software," and position titles such as "Lead Software Engineer." In such cases the word or phrase may be enriched with both labels and provided to a machine learning system as described in further detail herein, which then may select one of the labels as the "correct" label, based on previous training of the system. More generally, each metadata label assigned to a portion of unstructured text may be considered as an indication of an appropriate label that is not necessarily determinative, which is then provided to the trained machine learning system as described in further detail herein.

As specific examples, dictionaries may include one or more of the following types of data, though embodiments disclosed herein are not limited to these examples:

Known given names, family names, family name prefixes (e.g., "van der", "los", "de"), family name suffixes (e.g., "-son", "-sen"), and the like;

Company name prefixes and suffixes ("-tech", "micro-", etc.), job title suffixes (which may be more common in non-English languages, equivalent to "-maker", "-worker", etc.), and the like;

Salutations ("Dear", "Best regards", "Sincerely," "Yours, ", etc.)

Honorifics ("Mr", "Miss", etc.), generation titles (e.g., "Junior", "IV", etc.), academic titles ("Ph.D", "MBA" etc.), and the like;

Job title keywords ("assistant", "engineer", etc.), qualifiers ("principal", "senior", etc.), title indication words ("marketing", "administrative" etc.), and the like;

Organization keywords ("Bank", "Consultants" etc.)

Organization brands ("Quadient", "Wells Fargo" etc.)

Organization indication words ("American" etc.), legal forms ("Ltd", "LLC"), and the like Another type of source that may be used for enrichment is a pattern match or pattern matching system. Specific text patterns often indicate that the text represents a specific contact data type. For example, text matching may be used to identify a portion of unstructured text that represents an email, phone number, or, more generally, any type of contact data that has a known text format. As a specific example, a phone number library such as the open source "libphonenumber" library may be used to identify phone numbers based on their text pattern. Matches returned by such a library also may be further enriched with one or more metadata tags indicating the type of data or other attributes of the data (such as organization, geographic location, and the like). As another example, regular expressions may be created that match specific contact data types, such as email addresses. Such expressions may include variants, such as those in which the @-sign has been replaced by "[AT]" or "<at>", or similar variants, and other such variations.

Another type of data source that may be used for enrichment is a set of patterns that match known structures of an address. For example, parts of the unstructured text having a high concentration of numbers and/or address-like tokens such as "street", "road", and the like may be identified. These address candidates may be further compared against a list of known street addresses, known street address formats, or the like, such as the open source address library "libpostal" or a similar or equivalent library. In some embodiments, a matching score may be assigned by such a library, and only address candidates with the highest scores in a particular portion of unstructured text may be enriched with metadata tags or in further process steps.

Another type of data source that may be used for enrichment is one or more external services, such as web-based services, which may identify specific or general pieces of contact information. As a specific example, the open source Apache OpenNLP natural language processing library may be used to identify types of text for which one or more recognition models have been trained by a user. For example, a user may train a recognition system to recognize person names or titles, and then use the trained recognition system to identify such names in unstructured text. As with other enrichment sources, a matching score may be assigned to one or more portions of the unstructured text to indicate a confidence level that the portion of text matches the type of text that the recognition system has been trained to identify. An external service that requires training such as a natural language processing library or service may be trained prior to use with the systems and techniques disclosed herein, such as by a provider of the service, or it may be trained as part of the systems and techniques disclosed herein. For example, prior to enriching any text using an external service or other processing library, it may be trained based upon known data representing the types of data for which it will be used.

Different data sources may be used for different types of initial unstructured data. For example, OpenNLP often is more efficient and accurate at identifying person names within unstructured prose than at identifying the same names in other text such as email signatures. Accordingly, in some cases the particular data sources may be selected based upon the type of unstructured text being analyzed. Alternatively or in addition, multiple data sources may be used even where they provide similar or conflicting metadata labels to the same unstructured text, in which case the trained machine learning system may select a single label for use or otherwise disambiguate the metadata resulting from the use of multiple data sources.

At 230, after the unstructured text has been enriched with metadata indicating the types of contact information believed to be present and matching scores have been assigned to the enriched data, one or more features may be identified and calculated for each portion of text to which metadata and matching scores have been assigned. For example, based on the metadata enrichments, an array of numerical feature values may be calculated for each piece of a text string. Each metadata assigned to a portion of the unstructured text may be represented as a numerical feature, so that it can be fed into a classifying machine learning algorithm that may determine the relevancy and use of that number. Some of the numerical values may represent intrinsic text features, such as whether or not the text piece is capitalized like a name, while other numerical values represent whether or not a particular piece of metadata scores for the text piece.

As an example, a common feature may be a measure of the "forwards or backwards distance to metadata enrichment X". For this feature, if X represents the enrichment "given name", the unstructured text being analyzed is "John F Smith", and "John" has been marked during the enrichment phase as a known given name, the backwards distance from "Smith" to the known given name may be calculated as the numerical value 0.03 (three alphanumeric tokens). This value represents a relatively small distance backwards from the family name "Smith". A greater distance would be more likely to indicate that "Smith" is not a family name and therefore would cause "Smith" not to be considered a family name, but rather part of a title, organization name, or another text component in this particular text.

Other non-limiting examples of features that may be used include the following:
  Is a known given name
  Is a known family name
  Backward/forward distance to known name
  Backward/forward distance to part of given/family name
  Is alone on the line, i.e., no other text or tokens appear before a line break
  Percent of the text in uppercase
  Percent of the text in lowercase
  Percent of the text that is numeric text (0-9)
  Capitalized as a name (First letter uppercase, remainder lowercase)
  Non-alphanumeric characters before/after (e.g., @, comma, period, apostrophe)
  Concentration of digits and punctuation within a set distance on the same line A machine learning system may be trained based upon numerical features calculated for a relatively large amount of "training data", such as hundreds of thousands of example email signatures and other contact text blocks, or a similar data set, for which the correct contact information result is known. Based upon the training, a mathematical model is produced which aligns the expectations in the training data with the numerical values of the training examples. In general, any known technique for training a machine learning system and any known machine learning system or algorithm may be used, though it is expected that machine learning systems that are tailored to text manipulation, text token identification and analysis, and the like may be more efficient than more general machine learning systems. Typically, the machine learning model is trained once upon a large set of training data, and the trained model is applied to new unstructured text that has been processed as previously disclosed. Alternatively or in addition, the model may be trained or updated between each application to one or more sets of unstructured text, for example to identify and correct occurrences where the model is found to have incorrectly processed a portion of unstructured text. At the end of a training process or a portion of a training process, a trained machine learning model may be generated.

Referring again to FIG. 2, at 240 a trained model 235 as previously disclosed may then be applied to unstructured data for which the previously-described features have been identified and calculated, which are the same features used to train the machine learning system. The model may be used to identify one or more pieces of contact information in a portion of unstructured text, and/or to assign a most-likely type of contact information to some or all portions of the unstructured text and provide the identified text and classification as an output 245. In some embodiments, a confidence score also may be provided that indicates how likely it is that a particular portion of text is "correctly" identified, where the "correctness" of such an identification is based on the training of the machine learning system. For example, a machine learning system may identify a particular piece of enriched unstructured text as an email address. Based upon the results of the analysis, the machine learning model may provide an output 245 that indicates the portion of text identified as an email address, the portion of the unstructured text used to identify the email address, and/or a confidence level indicating the likelihood, according to the machine learning model, that the indicated text is in fact an email address. The confidence level may be, for example, a number between 0 and 1, with 1 indicating a 100% likelihood or confidence that the text is an email address (according to the model), and 0 indicating 0% confidence.

After the text pieces from a portion of unstructured text have been individually classified, they may be reassembled into groups that form a complete "entity" at 250, such as a complete person name, a postal address, a job title, or the like. For example, when a first name, last name, title, and email address have been identified, a "contact" object may be created that includes a structured representation of the identified person (first+last name), the person's title, and the person's email address, such as may be used within a contact management system. In some cases, the confidence scores may be used to determine whether or not individual portions of text are included in the entity or similar object. For example, a threshold may be used to limit the text portions included in the entity to those that have at least a minimum confidence level associated with them, such as 50%, 60%, 70%, or the like.

In some embodiments, an additional expert evaluation may be performed at 260 by providing the completed, reassembled entities into one or more "domain expert" modules. Such modules may be libraries, remote APIs, or the like, that are configured to evaluate a defined type of text. For example, one or more parsing libraries such as libphonenumber, libpostal, or the like may be applied (or re-applied) to the entities, to provide a further indication of whether the library indicates that the reassembled entity is in fact the type of contact information as it has been identified. There may be at least one expert for each entity domain such as person name, address, title, email address, and the like. The domain expert modules may post-process the entities in order to suppress them, re-format them, or apply any domain-specific extra logic. As a specific example, it has been found that even after specific training it is possible that a machine learning system as disclosed herein may incorrectly identify numerical text as being a phone number. By analyzing such text with a relatively strict phone number library, it may be possible to eliminate false positives from the final reassembled entity. Other non-limiting examples of expert domain modules may include phone number, postal address, email address, person name, organization name, and job title. As another example, a domain expert module for person names may re-format text into a common format, such as removing middle names or initials, using only a single middle initial followed by (or omitting) a period, re-capitalizing names in a consistent scheme, and the like. A domain expert module also resolve potential conflicts, such as where the classified text 245 or the text entity 250 includes multiple text portions that are identified as the same classification. As a specific example, the classification and entity generation process may identify multiple text portions as email addresses. The domain expert module may determine that one address should be re-classified as a "work" email and another as a "personal" email based on the top-level domains of the addresses, the format, preset or learned rules, or the like. Based upon the domain expert module evaluation at 260, a corrected text entity may be created at 270.

One or more reassembled entities may automatically, semi-automatically, or otherwise be provided to other systems at 280, whether they have been revised through a domain expert evaluation or not. Other systems that may benefit from the structured entities generated through this process include contact or customer management systems, postal and shipping systems, cost calculation systems, and the like. They may be provided individually, such as where a portion of text is being analyzed to identify a specific entity, or in bulk, such as where it is intended to automatically create a database of contact information for multiple entities from a large portion of unstructured text.

Embodiments disclosed herein may allow for significant time saving compared to a manual process or other known processes that require human reading of text or human involvement between initial text identification (such as copying a signature block from a letter or email) and prior text automation techniques. Embodiments disclosed herein also may prevent errors or omissions that result from a human reading the text and/or transferring some or all of the potential contact data to some other system, during which it is likely that at least some text may be accidentally miscategorized.

As a specific example, embodiments disclosed herein may operate on a portion of unstructured text extracted from an email signature, letter heading or signature block or the like, such as the following:

John F Smith
Broker
Morrison Real Estate
addr: 555 Main St. W, St. Louis Mo. 98117
cell: 425.555.6935

The following enrichment tags may be applied to this text, based upon one or more dictionaries and other enrichment sources as previously disclosed:

John=known given name
Smith=known given name
Smith=known family name
Louis=known family name
Louis=known given name
Broker=known job title keyword
Morrison=known given name
Morrison=known family name
Real Estate=known company keyword
Estate=known company keyword
Seattle=known company indicator word
St. Louis=known location (city name)

A score may be applied to each tag depending upon the enrichment source that provided it. For example, a standard source may result in a score of 1.0, whereas a less-reliable source may result in a score that is less than one. This score may be separate from the confidence score disclosed herein, in that it may be based entirely on the source of the dictionary that results in the score rather than the analysis of a particular text segment by a trained machine learning system as disclosed herein.

The text then may be broken up into tokens as previously disclosed, such as the following:

John
(space)
F
(space)
Smith
(linebreak)
Broker
Morrison
(space)

and so on. For each token, one or more features may be calculated for each potential enrichment tag. For example, where three features are calculated, 3×N total features may be calculated for N tokens. For distance calculations, the number of token spaces may be used, or the distance may be scaled such as by dividing the token distance by 100 to provide a number between 0 and 1. Continuing the example above, the following tokens may be calculated:

|  | backwards distance to known given name | is known given name | forwards distance to known given name | backwards distance to known family name | is known family name | forwards distance to known family name | text length | is whitespace |
| --- | --- | --- | --- | --- | --- | --- | --- | --- |
| "John" | 1 | 1 | 0.04 | 1 | 0 | 0.04 | 0.04 | 0 |
| (space) | 0.01 | 0 | 0.03 | 1 | 0 | 0.03 | 0.01 | 1 |
| "F" | 0.02 | 0 | 0.02 | 1 | 0 | 0.02 | 0.01 | 0 |
| (space) | 0.03 | 0 | 0.01 | 1 | 0 | 0.01 | 0.01 | 1 |
| "Smith" | 0.04 | 1 | 0.04 | 1 | 1 | 0.04 | 0.05 | 0 |
| (linebreak) | 0.01 | 0 | 0.03 | 0.01 | 0 | 0.03 | 0.01 | 1 |
| Morrison | 0.02 | 1 | 1 | 0.02 | 1 | 1 | 0.08 | 0 |

It will be understood that these tokens and features are provided as non-limiting examples, and many others may be used without departing from the scope of the inventive embodiments disclosed herein.

As previously indicated, the use of such tokens in a trained machine learning system may be used, for example, to disambiguate text portions to which multiple metadata labels have been assigned. Continuing this example, the machine learning system may determine that "Louis" is properly considered as part of an address due to its proximity to a state abbreviation and a known ZIP code rather than as part of the name that is significantly "farther away" in the unstructured text.

The set of tokens and feature calculations may be represented as vectors and may be provided to a trained machine learning system such as a neural network as previously disclosed. The system may then provide classifications of each token as a particular type of contact information, in some cases with an associated confidence score, such as shown at 110, 120 in FIG. 1B. These tokens then may be assembled into structured text, such as shown at 130 in FIG. 1C.

As previously disclosed, the classified text may then be provided to one or more expert modules for post-processing. In some cases, the expert module may not make any changes or provide any further information about a particular piece of text. In others, it may provide additional information, such as where a phone number expert module is able to identify a country of origin, and thereby enhance the text classified as a "phone number" by providing the appropriate country calling code (which may have been absent from the initial unstructured text). In some cases, the expert module may indicate that the classification provided by the machine learning system should be discarded or overridden, such as where the classification indicates that a numeric text string is a phone number, but the expert module determines that the classified numeric text cannot possibly be a phone number due to the combination of number of digits and leading/trailing numbers, or the like. This may occur, for example, when a domain expert module is available that include additional validation logic or patterns that are not available within the machine learning system.

Although described with respect to contact information, embodiments provided herein may be used with, or extended to include, other forms of structured information that include specific, well-defined fields in a similar manner to contact information. For example, the same general techniques may be used to process unstructured text to identify, collect, and process product names or information, geographic information, customer information, billing or payment information, medical data, and the like. For example, specific structured text may be processed according to techniques disclosed herein by using appropriate enrichment sources, enrichment tags, expert modules, and trained neural networks or other machine learning structures.

Figure 3:
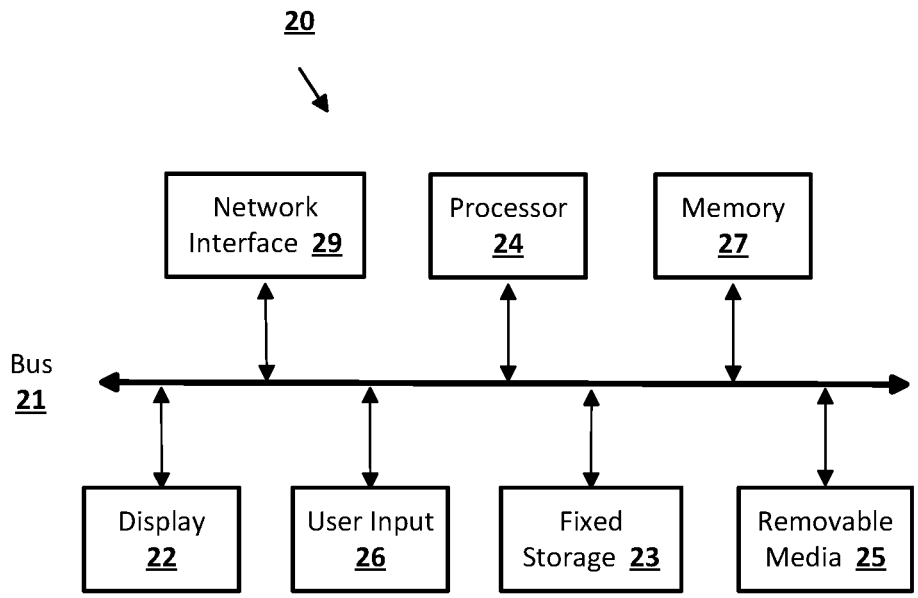
FIG. 3 is an example computing device suitable for implementing or interfacing with embodiments disclosed herein.

Embodiments disclosed herein may be implemented in and on, and used with a variety of computerized systems and network architectures. Such systems may be used to implement the techniques disclosed herein, such as those described with respect to FIGS. 1-2, and/or they may interface with such systems, such as where structured text as disclosed herein is subsequently provided to a separate computerized system. FIG. 3 is an example computing device 20 suitable for implementing or interfacing with embodiments disclosed herein. The device 20 may be, for example, a desktop or laptop computer, a server cloud-based computer system, a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection. The bus 21 allows data communication between the central processor 24 and one or more memory components. Applications generally are stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Figure 4:
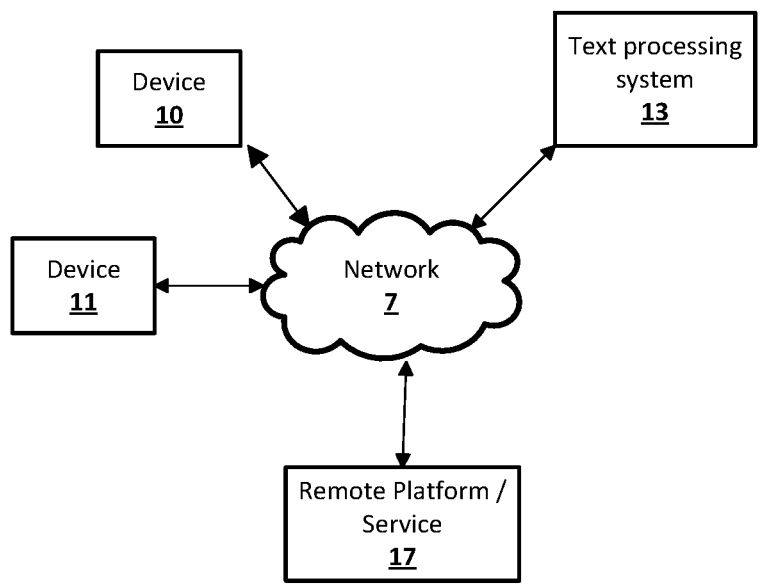
FIG. 4 shows an example network arrangement according to an embodiment disclosed herein.

FIG. 4 shows an example network arrangement according to an embodiment disclosed herein. As previously described, a computerized text processing system 13 may be configured to convert unstructured text to structured text as disclosed herein. One or more devices 10, 11, such as local computers, smart phones, tablet computing devices, and the like may connect to the processing system via one or more networks 7. The network may be a local network, wide-area network, the Internet, or any other suitable communication network or networks, and may be implemented on any suitable platform including wired and/or wireless networks. Each device may be a computing device as previously described with respect to FIG. 3. A remote platform or service 17, which may itself include one or more computing systems and/or networks, may provide unstructured text to, and/or receive structured text from, the processing system 13 as previously disclosed. The processing system 13 may be implemented on one or more computers or computerized systems such as described with respect to FIG. 3, cloud computing systems or other hosted systems, or any other suitable computerized system.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
   receiving unstructured text;
   identifying a plurality of text segments within the unstructured text and enriching the unstructured text by assigning one or more metadata labels to each of the text segments;
   calculating one or more feature values for each text segment for at least one of the metadata labels associated with at least one of the text segments;
   providing the feature values, metadata labels, and text segments to a trained machine learning system;
   receiving, from the machine learning system, an indication of a classification for at least one of the text segments;
   based upon the indication of the classification for the at least one of the text segments, identifying the at least one of the text segments as a portion of contact data;
   receiving, from the machine learning system, a confidence score for each of the classifications, wherein the at least one of the text segments is identified as a portion of contact data based upon a confidence score assigned to the classification of the at least one text segment; and
   generating structured contact information for an entity based on the confidence score for each of the classifications and the text segments.

2. The method of claim 1, wherein the step of assigning one or more metadata labels to each of the text segments comprises:
   processing each text segment of the text segments with at least one enrichment source; and
   based upon an output of the at least one enrichment source, assigning the one or more metadata labels to the each text segment.

3. The method of claim 2, wherein the at least one enrichment source is selected from the group consisting of: a dictionary of name parts; a pattern matching system; an address-matching library; and an external contact information service.

4. The method of claim 3, wherein the at least one enrichment source comprises a plurality of different enrichment sources, each enrichment source independently selected from the group consisting of: a dictionary of name parts; a pattern matching system; an address-matching library; and an external contact information service.

5. The method of claim 1, wherein the structured contact information includes only text segments having a confidence score above a minimum confidence level.

6. The method of claim 1, further comprising:
processing at least a portion of the structured contact information for the entity with a domain expert module; and
based upon the processing, generating revised structured contact information for the entity.

7. The method of claim 1, further comprising:
providing the structure contact information for the entity and structured contact information for a plurality of other entities to a contact information database.

8. A system comprising:
a processor configured to:
receive unstructured text;
identify a plurality of text segments within the unstructured text and enriching the unstructured text by assigning one or more metadata labels to each of the text segments;
calculate one or more feature values for each text segment for at least one of the metadata labels associated with at least one of the text segments;
provide the feature values, metadata labels, and text segments to a trained machine learning system;
receive, from the machine learning system, an indication of a classification for at least one of the text segments;
identify the at least one of the text segments as a portion of contact data based upon the indication of the classification for the at least one of the text segments;
provide a confidence score for each of the classifications, wherein the at least one of the text segments is identified as a portion of contact data based upon a confidence score assigned to the classification of the at least one text segment; and
generate structured contact information for an entity based on the confidence score for each of the classifications and the text segments.

9. The system of claim 8, further comprising a computer-based system configured to execute the machine learning system.

10. The system of claim 9, further comprising a database storing training data to train the machine learning system.

11. The system of claim 8, wherein the step of assigning one or more metadata labels to each of the text segments comprises:
processing each text segment of the text segments with at least one enrichment source; and
based upon an output of the at least one enrichment source, assigning the one or more metadata labels to the each text segment.

12. The system of claim 11, wherein the at least one enrichment source is selected from the group consisting of: a dictionary of name parts; a pattern matching system; an address-matching library; and an external contact information service.

13. The system of claim 12, wherein the at least one enrichment source comprises a plurality of different enrichment sources, each enrichment source independently selected from the group consisting of: a dictionary of name parts; a pattern matching system; an address-matching library; and an external contact information service.

14. The system of claim 8, wherein the processor is further configured to:
process at least a portion of the structured contact information for the entity with a domain expert module; and
based upon the processing, generate revised structured contact information for the entity.

15. The system of claim 8, wherein the processor is further configured to:
provide the structure contact information for the entity and structured contact information for a plurality of other entities to a contact information database.

16. A non-transitory computer-readable storage medium storing a plurality of instructions that, when executed, cause a processor to:
receive unstructured text;
identify a plurality of text segments within the unstructured text and enriching the unstructured text by assigning one or more metadata labels to each of the text segments;
calculate one or more feature values for each text segment for at least one of the metadata labels associated with at least one of the text segments;
provide the feature values, metadata labels, and text segments to a trained machine learning system;
receive, from the machine learning system, an indication of a classification for at least one of the text segments;
identify the at least one of the text segments as a portion of contact data based upon the indication of the classification for the at least one of the text segments;
provide a confidence score for each of the classifications, wherein the at least one of the text segments is identified as a portion of contact data based upon a confidence score assigned to the classification of the at least one text segment; and
generate structured contact information for an entity based on the confidence score for each of the classifications and the text segments.

17. The non-transitory computer-readable storage medium of claim 16, wherein the step of assigning one or more metadata labels to each of the text segments comprises:
processing each text segment of the text segments with at least one enrichment source; and
based upon an output of the at least one enrichment source, assigning the one or more metadata labels to the each text segment.

18. The non-transitory computer-readable storage medium of claim 16, the plurality of instructions, when executed, further causing the processor to:
process at least a portion of the structured contact information for the entity with a domain expert module; and
based upon the processing, generate revised structured contact information for the entity.

19. The non-transitory computer-readable storage medium of claim 16, the plurality of instructions, when executed, further causing the processor to:
provide the structure contact information for the entity and structured contact information for a plurality of other entities to a contact information database.

20. A method comprising:
receiving unstructured text;
identifying a plurality of text segments within the unstructured text and enriching the unstructured text by:
processing each text segment of the plurality of text segments with at least one enrichment source; and
based upon an output of the at least one enrichment source, assigning one or more metadata labels to the each text segment;

calculating one or more feature values for each text segment;
providing the feature values, metadata labels, and text segments to a trained machine learning system;
receiving, from the machine learning system, an indication of a classification for at least one of the text segments;
based upon the indication of the classification for the at least one of the text segments, identifying the at least one of the text segments as a portion of contact data;
receiving, from the machine learning system, a confidence score for each of the classifications, wherein the at least one of the text segments is identified as a portion of contact data based upon a confidence score assigned to the classification of the at least one text segment; and
generating structured contact information for an entity based on the confidence score for each of the classifications and the text segments.

21. A system comprising:
a processor configured to:
receive unstructured text;
identify a plurality of text segments within the unstructured text and enriching the unstructured text by:
processing each text segment of the plurality of text segments with at least one enrichment source; and
based upon an output of the at least one enrichment source, assigning the one or more metadata labels to the each text segment;
calculate one or more feature values for each text segment;
provide the feature values, metadata labels, and text segments to a trained machine learning system;
receive, from the machine learning system, an indication of a classification for at least one of the text segments;
identify the at least one of the text segments as a portion of contact data based upon the indication of the classification for the at least one of the text segments;
provide a confidence score for each of the classifications, wherein the at least one of the text segments is identified as a portion of contact data based upon a confidence score assigned to the classification of the at least one text segment; and
generate structured contact information for an entity based on the confidence score for each of the classifications and the text segments.

22. A non-transitory computer-readable storage medium storing a plurality of instructions that, when executed, cause a processor to:
receive unstructured text;
identify a plurality of text segments within the unstructured text and enriching the unstructured text by:
processing each text segment of the text segments with at least one enrichment source; and
based upon an output of the at least one enrichment source, assigning the one or more metadata labels to the each text segment;
calculate one or more feature values for each text segment;
provide the feature values, metadata labels, and text segments to a trained machine learning system;
receive, from the machine learning system, an indication of a classification for at least one of the text segments;
identify the at least one of the text segments as a portion of contact data based upon the indication of the classification for the at least one of the text segments;
provide a confidence score for each of the classifications, wherein the at least one of the text segments is identified as a portion of contact data based upon a confidence score assigned to the classification of the at least one text segment; and
generate structured contact information for an entity based on the confidence score for each of the classifications and the text segments.

* * * * *